(12) United States Patent
Schimanski et al.

(10) Patent No.: US 9,599,261 B2
(45) Date of Patent: Mar. 21, 2017

(54) VOLUMETRIC SEALING SYSTEM

(75) Inventors: Freddie G. Schimanski, Madison, CT (US); Alan J. Michaud, Wallingford, CT (US)

(73) Assignee: American Seal and Engineering Company, Inc., Orange, CT (US)

(*) Notice: Subject to any disclaimer, the term of this patent is extended or adjusted under 35 U.S.C. 154(b) by 1208 days.

(21) Appl. No.: 12/066,939

(22) PCT Filed: May 11, 2006

(86) PCT No.: PCT/US2006/018330
§ 371 (c)(1),
(2), (4) Date: Mar. 14, 2008

(87) PCT Pub. No.: WO2007/044080
PCT Pub. Date: Apr. 19, 2007

(65) Prior Publication Data
US 2008/0258407 A1    Oct. 23, 2008

Related U.S. Application Data

(60) Provisional application No. 60/724,490, filed on Oct. 6, 2005.

(51) Int. Cl.
*F16L 21/03* (2006.01)
*F16L 17/035* (2006.01)
(Continued)

(52) U.S. Cl.
CPC ............. *F16L 21/03* (2013.01); *F16L 17/035* (2013.01); *F16L 17/073* (2013.01); *F16L 21/035* (2013.01); *F16L 23/02* (2013.01)

(58) Field of Classification Search
CPC .... F16L 17/035; F16L 17/073; F16J 15/3232; F16J 15/3236
(Continued)

(56) References Cited

U.S. PATENT DOCUMENTS 2,646,294 A * 7/1953 Anderson ................. 285/145.4
2,926,976 A * 3/1960 Bowerman .......... F16J 15/3284
277/437
(Continued)

FOREIGN PATENT DOCUMENTS

EP    0212331    3/1987
GB    515549     12/1939
GB    1465360    2/1977

*Primary Examiner* — James Hewitt
(74) *Attorney, Agent, or Firm* — Raymond A. Nuzzo

(57) ABSTRACT

An adjustable joint having an outer housing section and an inner housing section telescopically disposed within the outer housing section. The inner housing section has an exterior portion within the outer housing section and which defines a circumferentially extending shoulder. An annular seal is positioned on the shoulder to create a seal between the outer housing section and the inner housing section. A circumferentially extending heat insulating spacer is attached to the shoulder and abuts the seal to retain the seal in place. A circumferentially extending heat shield is rigidly connected to the shoulder and abuts the heat insulating spacer and is located such that the heat insulating spacer is positioned between the heat shield and the annular seal. A circumferentially extending retainer ring is connected to the shoulder and abuts the heat shield to retain the heat shield, heat insulating spacer and annular seal in place so that when outer housing section and inner housing section move axially or rotate with respect to each other, the sealing function of the annular, metallic seal is maintained.

12 Claims, 16 Drawing Sheets

(51) Int. Cl.
  *F16L 17/073* (2006.01)
  *F16L 21/035* (2006.01)
  *F16L 23/02* (2006.01)

(58) Field of Classification Search
  USPC .................. 285/116, 144.1, 145.1, 145.4
  See application file for complete search history.

(56) References Cited

U.S. PATENT DOCUMENTS

| | | | |
|---|---|---|---|
| 3,408,095 A * | 10/1968 | Moore | 285/110 |
| 3,596,934 A * | 8/1971 | De Cenzo | 285/55 |
| 3,656,784 A | 4/1972 | Dow | |
| 3,889,985 A * | 6/1975 | Gartmann | 285/95 |
| 4,195,849 A * | 4/1980 | Taft | F16J 15/3268 |
| | | | 277/437 |
| 4,561,679 A * | 12/1985 | Choate | 285/95 |
| 5,772,259 A * | 6/1998 | Geary et al. | 285/145.1 |
| 5,865,400 A * | 2/1999 | Pike et al. | 244/134 B |
| 5,960,700 A * | 10/1999 | Staggs | F16J 15/3236 |
| | | | 92/240 |
| 6,056,329 A * | 5/2000 | Kitani et al. | 285/145.3 |
| 6,131,960 A | 10/2000 | McHughs | |
| 6,305,426 B1 * | 10/2001 | Sato et al. | 138/120 |

\* cited by examiner

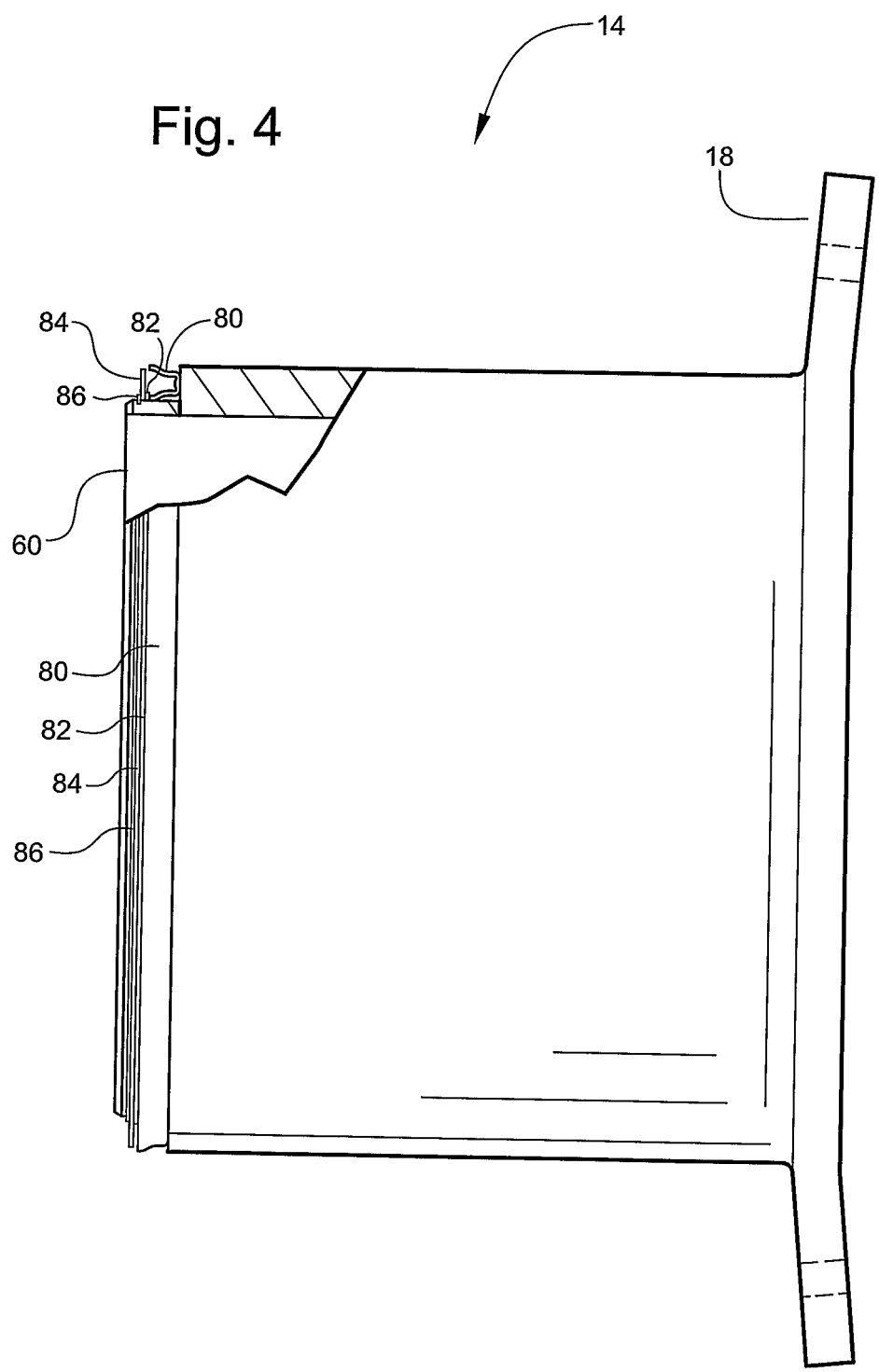

VOLUMETRIC SEALING SYSTEM

CROSS-REFERENCE TO RELATED APPLICATIONS

This application claims the benefit of the filing date of U.S. provisional application No. 60/724,490, filed Oct. 6, 2005.

TECHNICAL FIELD

The present invention generally relates to sealing systems.

BACKGROUND ART

Various prior art sealing systems are shown in U.S. Pat. Nos. 6,027,125, 5,433,183, 5,232,252, 4,552,385, 4,456,288, 3,837,687, 3,779,564, 3,680,874, 3,447,819, 3,185,504, 2,922,665, 2,840,350, 2,839,089, and 2,430,445.

DISCLOSURE OF THE INVENTION

The present invention is directed to a volumetric sealing system that provides a self-aligning tube-joint that can be connected between two couplings, manifolds, tubes, transfer tubes, pipes or other conduits so as to allow fluids or other matter to flow from one coupling to another without leakage and without foreign particles and environmental elements entering the interior of the tube joint. The sealing system of the present invention can be used in a variety of environments and with any of a variety of flowing matter such as pressurized or non-pressurized fluids, waste, petroleum, water, hydraulic fluid, gases, etc. The volumetric sealing system of the present invention can operate with a vacuum therein so as to allow the flow of non-fluid type matter such as wheat, flour, soy, etc.

In one embodiment, the present invention comprises a sealing system comprising an outer housing section having an interior region and a pair of outlets in communication with the interior region. The outer housing section includes an interior surface surrounding the interior region. The sealing system further comprises an inner housing section having a first portion disposed within the interior region of the outer housing section and a second portion external to the interior region of the outer housing section. The inner housing section has an exterior surface that contacts the interior surface of the outer housing section. The inner housing section has an interior region for the flow of matter therethrough. The first portion of the inner housing section has an outlet in communication with the interior region of the inner housing section to allow matter to flow from the interior region of the inner housing section to the interior region of the outer housing section. The inner housing section defines a circumferentially extending shoulder that is contiguous with the exterior surface of the inner housing section and proximate to the outlet of the inner housing section. The sealing system further comprises an annular seal member positioned on the shoulder. The annular seal member is sized so as to contact the interior surface of the outer housing section and create a seal. The sealing system further comprises a retainer ring attached to the exterior surface of the inner housing section proximate to the shoulder to retain the annular seal member in place and to create a heat barrier to protect the annular seal member.

Other embodiments of the volumetric sealing system of the present invention are described in the ensuing description and shown in the accompanying drawings.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which:

FIG. 4 is a side elevational view of an inner housing shown in FIGS. 1-4;

MODES FOR CARRYING OUT THE INVENTION

Figure 1:
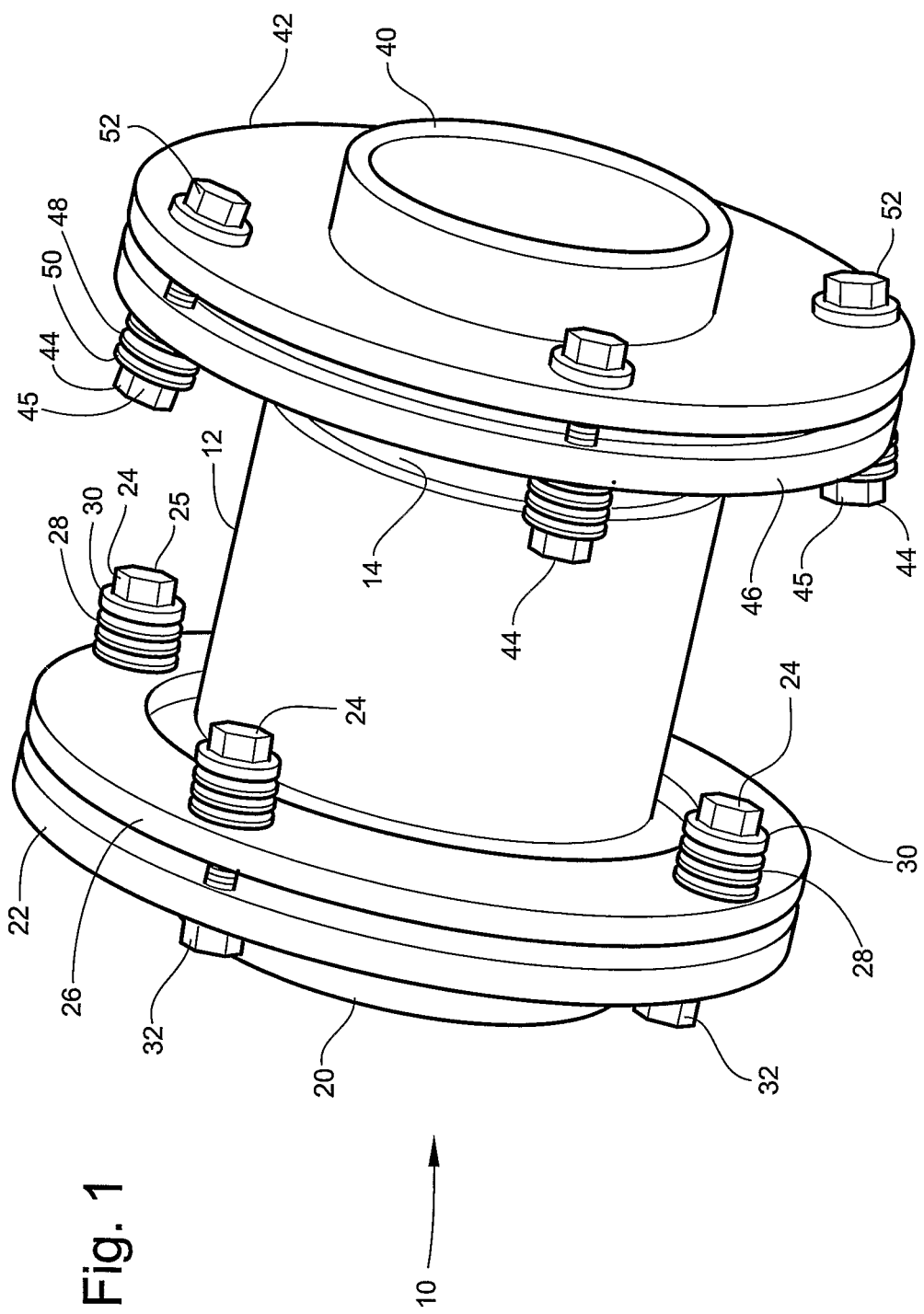
FIG. 1 is a perspective view of a volumetric sealing system in accordance with one embodiment of the present invention.
Figure 2:
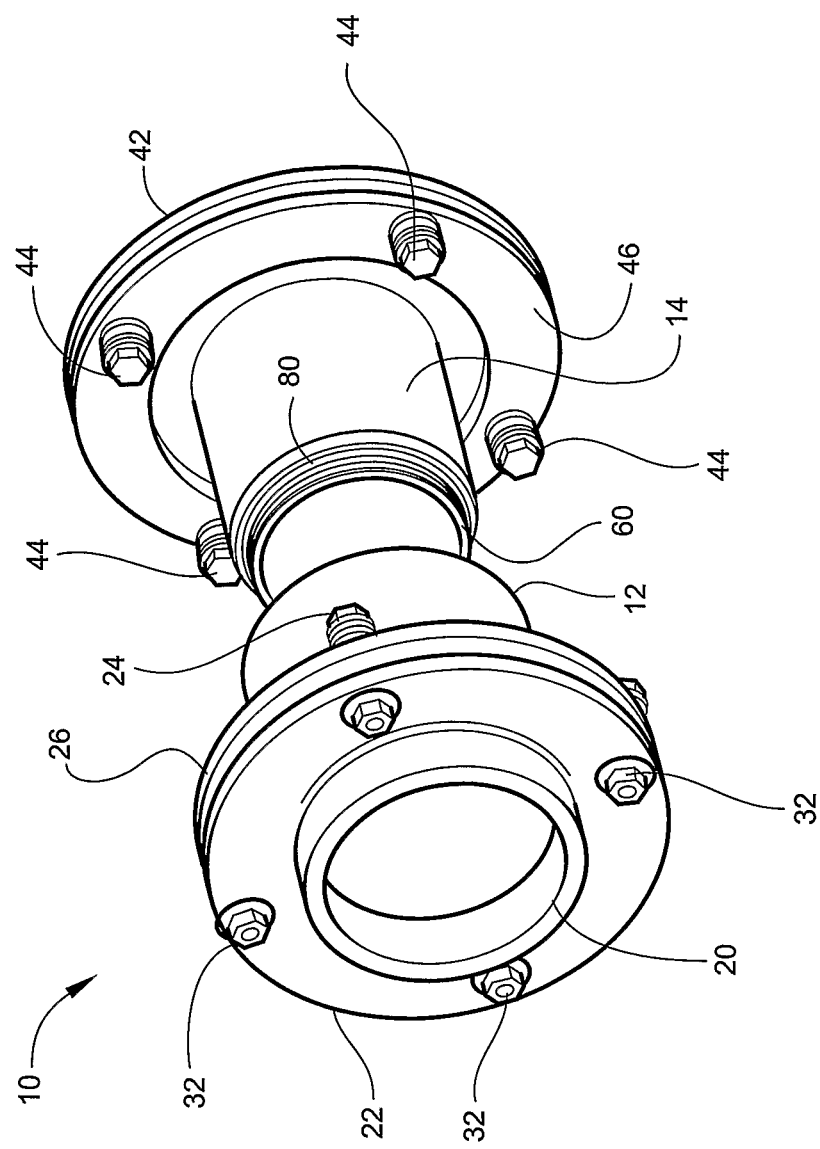
FIGS. 2 and 3A are exploded views of the volumetric sealing system of FIG. 1.

The volumetric sealing system of the present invention is configured to have any one of a variety of matter flow therethrough. As used herein, the terms "matter" or "flowing matter" include, but are not limited to, high pressure fluids, medium pressure fluids, low pressure fluids, non-pressurized fluids, water, hydraulic fluid, petroleum, fuels, chemicals, non-fluid type matter such as fertilizers, raw food constituents (e.g. wheat, barley, flour, corn, etc.) etc. The volumetric sealing system of the present invention can also operate with a vacuum created therein.

Referring to FIGS. 1-5, there is shown volumetric sealing system 10 of the present invention. Sealing system 10 generally comprises outer housing 12 and inner housing 14. In one embodiment, inner housing 14 is telescopically disposed in outer housing 12. Inner housing 14 is slidably positioned within outer housing 12. Outer housing 12 has a generally cylindrical shape and is configured to function as a conduit for flowing matter. This flowing matter can be pressurized or non-pressurized fluids. Similarly, inner housing 14 has a generally cylindrical shape and is configured to function as a conduit for the flowing matter. This flowing matter flows in the direction indicated by arrow 17 in the central portion of the view in FIG. 5. In one embodiment, inner housing 12 and outer housing 14 are configured as transfer tubes. As shown in FIG. 3B, outer housing 12 has flanged section 16 and inner housing 14 has flanged section 18. Outer housing 12 and inner housing 14 can be fabricated from materials chosen from a variety of metals and/or non-metals. Examples are stainless steel, titanium, copper, brass, nickel, steel, iron, urethanes, nylons, and Teflons. In one embodiment, outer housing 12 and inner housing 14 are fabricated from corrosion-resistant metals.

Referring to FIGS. 1-5, sealing system 10 includes coupling 20 which has flanged section 22. Flanged section 22 abuts flanged section 16 of outer housing 12. Flanged sections 16 and 22 have openings for receiving tension bolts 24. Each tension bolt 24 has head section 25. In one embodiment, load ring 26, load device 28 and alignment spacer are positioned between head 25 of tension bolt 24 and flanged section 16. Nut 32 is engaged with tension bolt 24 to provide a tight abutting relationship between flanged sections 16 and 22. In one embodiment, load device 28 is a spring. In another embodiment, load device 28 is a Belleville washer.

Referring to FIGS. 1-5, sealing system 10 includes coupling 40 which has a flanged section 42. Flanged section 42 abuts flanged section 18 of inner housing 14. Flanged sections 18 and 42 have openings for receiving tension bolts 44. Each tension bolt 44 has head section 45. Sealing system 10 further includes load ring 46, load device 48 and alignment spacer 50. Load device 48 and alignment spacer 50 are positioned between head 45 of tension bolt 44 and load ring 46. Nut 52 is engaged with tension bolt 44 to provide a tight abutting relationship between flanged sections 18 and 42. In one embodiment, load device 48 is a spring. In another embodiment, load device 48 is a Belleville washer.

Figure 6A:
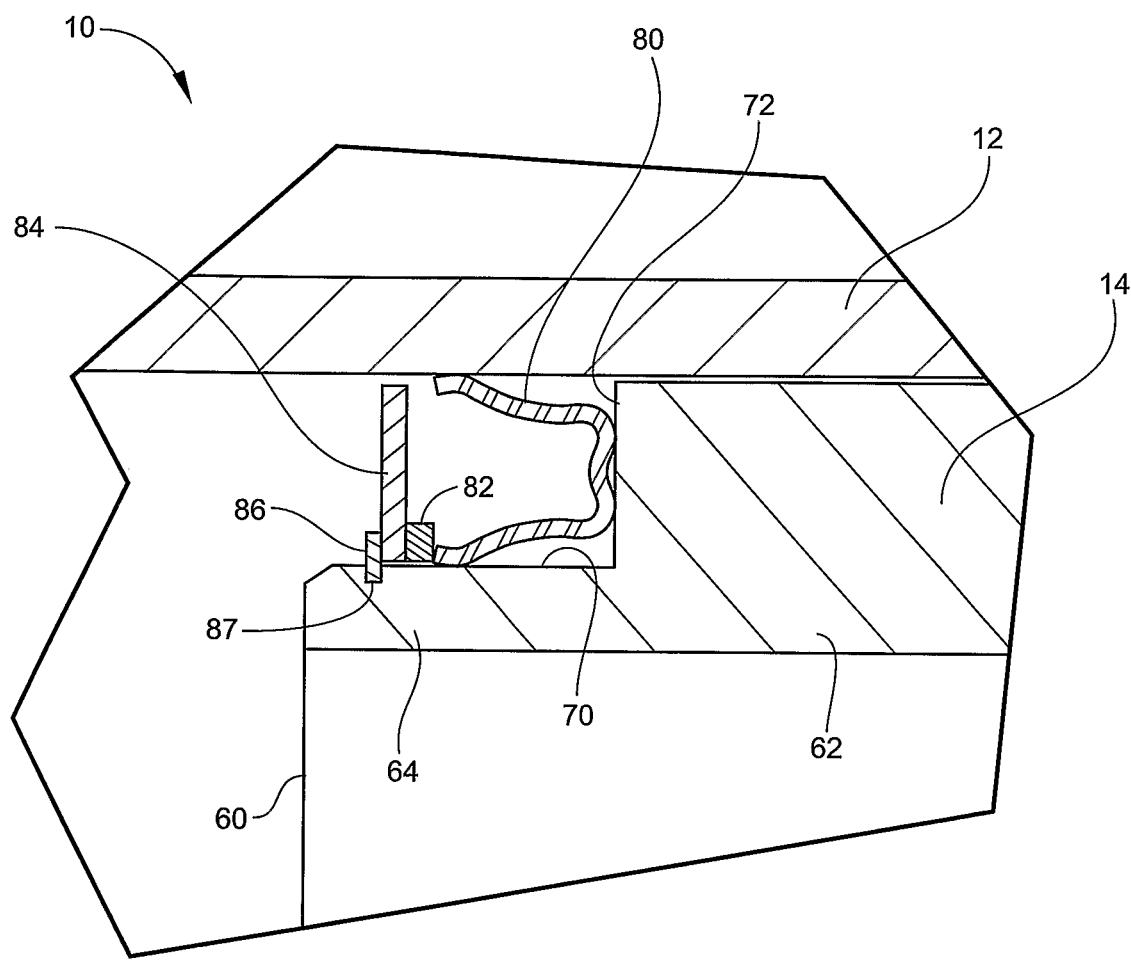
FIG. 6A is an enlarged view of a portion of the view of FIG. 5.

Referring to FIGS. 4 and 6A, inner housing 14 has end 60 that has an opening or outlet through which matter passes or flows. Inner housing 14 has sections 62 and 64. The outer diameter of section 64 is less than the outer diameter of section 62. This difference in the outer diameters of sections 62 and 64 provides circumferentially extending shoulder 70. Shoulder 70 is contiguous with generally vertical wall 72. In accordance with the invention, volumetric sealing system 10 further includes annular seal 80 that is positioned on shoulder 70 and abuts wall 72. Thus, shoulder 70 and wall 72 define an annular seat for receiving annular seal 80. Annular seal 80 has a predetermined size and inner diameter that allow annular seal 80 to fit snugly around the perimeter of section 64 of inner housing 14. In a preferred embodiment, annular seal 80 is an axial seal. In one embodiment, annular seal 80 is a metallic seal and is fabricated from suitable metals chosen from the group comprising nickel super alloy and nickel cobalt alloys. Annular seal 80 can also be made from other metal alloys. Thus, annular seal 80 can be fabricated from suitable materials chosen from metals, metal alloys, non-metals, and polymers. Examples of such suitable materials include ceramic, composite materials, plastic, Teflon, Teflon coated metals, etc. Annular seal 80, when fabricated from metal, can have a coating, such as Teflon and metal coatings. In one embodiment, as shown in FIG. 6A, annular seal 80 is configured to have a general "U" cross-section. In an alternate embodiment, annular seal 80 is configured to have a general "V" cross-section. In a further embodiment, annular seal 80 is configured to have a modified "V" cross-section. In yet another embodiment, annular seal 80 is configured as the annular, axial, "J" shaped seal described in commonly owned U.S. Pat. No. 6,983,940, issued Jan. 10, 2006 and entitled "Metallic Seal", the disclosure of which patent is incorporated herein by reference.

Referring to FIGS. 4-6A, sealing system 10 further comprises circumferentially extending heat insulating spacer 82, circumferentially extending heat shield 84 and retainer ring 86. In a preferred embodiment, retainer ring 86 is firmly positioned in circumferentially extending groove 87. Thus, retainer ring 86 is rigid and thus cannot exhibit any movement. Retainer ring 86 can be formed integrally with inner housing 14 during the manufacturing process. In another embodiment, retainer ring 86 is a separate component that is rigidly connected to shoulder 70 by any suitable technique, e.g. welding, etc. Retainer ring 86 is fabricated from a material that can withstand relatively high temperatures. Insulating spacer 82 abuts one of the distal ends of annular seal 80 and therefore, keeps annular seal 80 in place. In a preferred embodiment, heat insulating spacer 82 is fabricated from a material that does not transfer any appreciable heat. Thus, heat insulating spacer 82 removes annular seal 80 from the heat zone. Heat insulating spacer 82 may be fabricated from any one of a variety of materials including ceramics. Heat shield 84 is positioned between and abuts retainer ring 86 and heat insulating spacer 82. In higher temperature applications, heat shield 84 shields annular seal 80 from a substantial amount of heat and thus also functions to remove or substantially isolate annular seal 80 from the heat zone. Thus, heat insulating spacer 82 and heat shield 84 cooperate to significantly reduce the amount of heat to which annular seal 80 is exposed thereby preserving the integrity and operational lifespan of annular seal 80. Heat shield 84 may be fabricated from any one of a variety of materials including Waspaloy.

Figure 5:
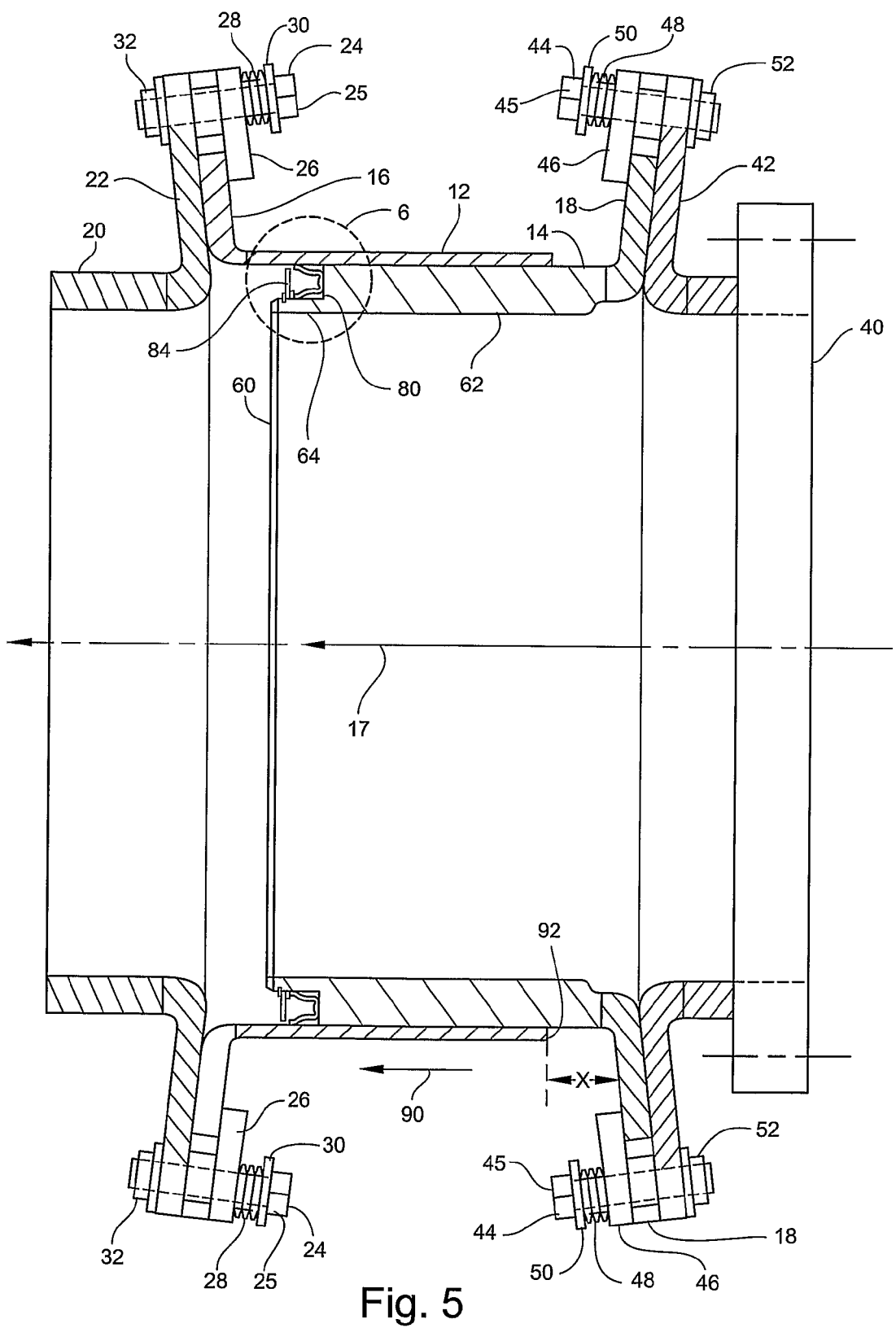
FIG. 5 is a cross-sectional view of the volumetric sealing system of FIG. 1.

Referring to FIG. 5, inner housing 14 can move axially, in the direction indicated by arrow 90, with respect to outer housing 12. Specifically, inner housing 14 can move axially a distance X which is defined by the distance between flange 18 and outer edge 92 of outer housing 12. This feature allows for contraction and expansion of sealing system 10 due to significant variations in temperature, or mechanical vibrations or mechanical motion. The ability of inner housing 14 to move axially also facilitates removal of inner, housing 14 for maintenance. Furthermore, inner housing 14 can rotate or move radially with respect to outer housing 12 in the event an angular force is applied to either inner housing 14 or outer housing 12. The sealing function provided by annular seal 80 is maintained whether inner housing 14 moves axially or radially (i.e. rotation) with respect to outer housing 12 and vice versa. Thus, annular seal 80 provides a high-integrity seal between outer housing 12 and inner housing 14 so as to prevent leakage of flowing matter flowing through outer housing 12 and inner housing 14. This high-integrity seal is maintained even when inner housing 14 moves or is moving with respect to outer housing 12. In higher temperature applications, heat shield 84 and heat insulating spacer 82 cooperate to substantially isolate annular seal 80 from the heat zone thereby preserving the integrity and operational lifespan of annular seal 80.

Figure 3A:
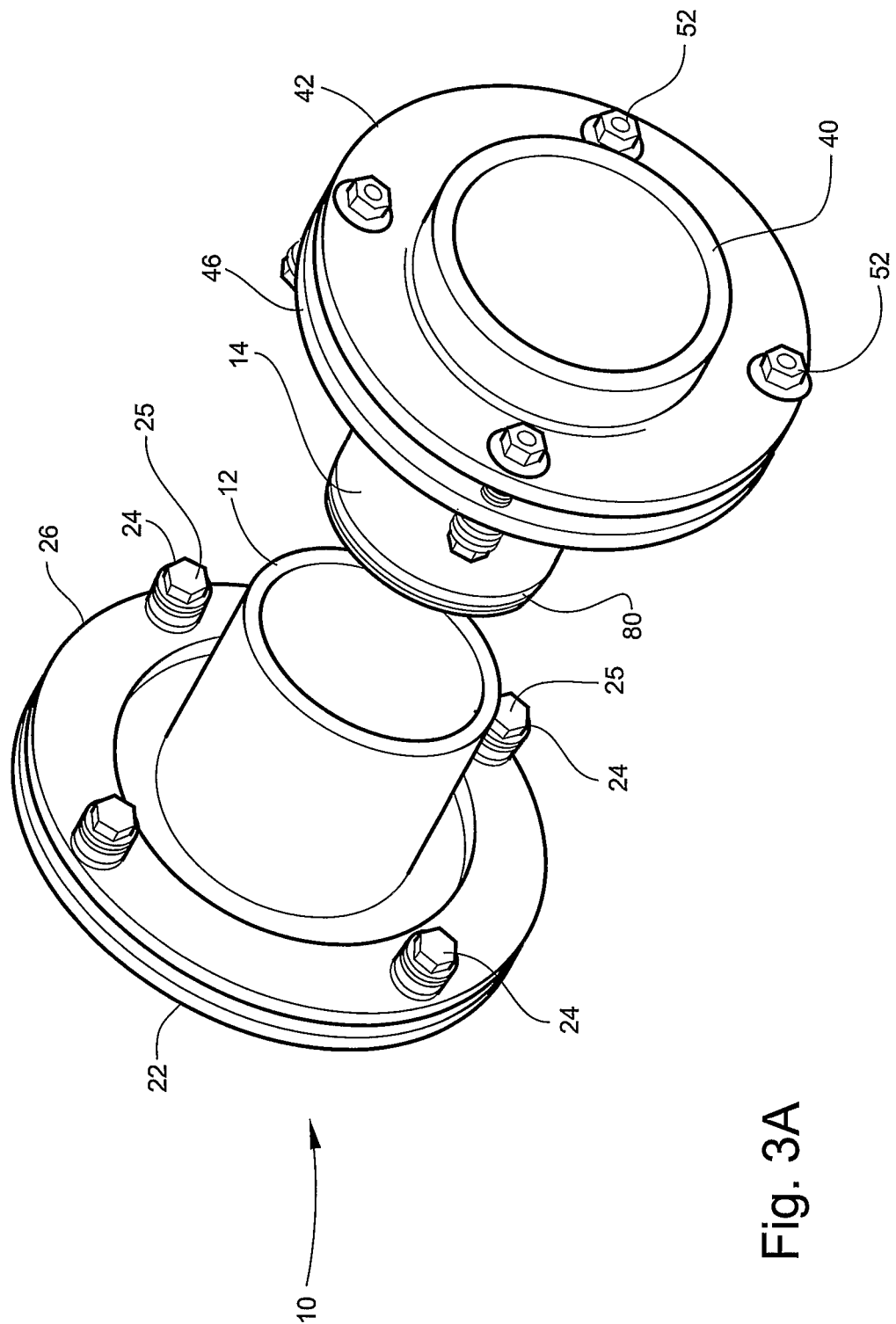
Figure 3B:
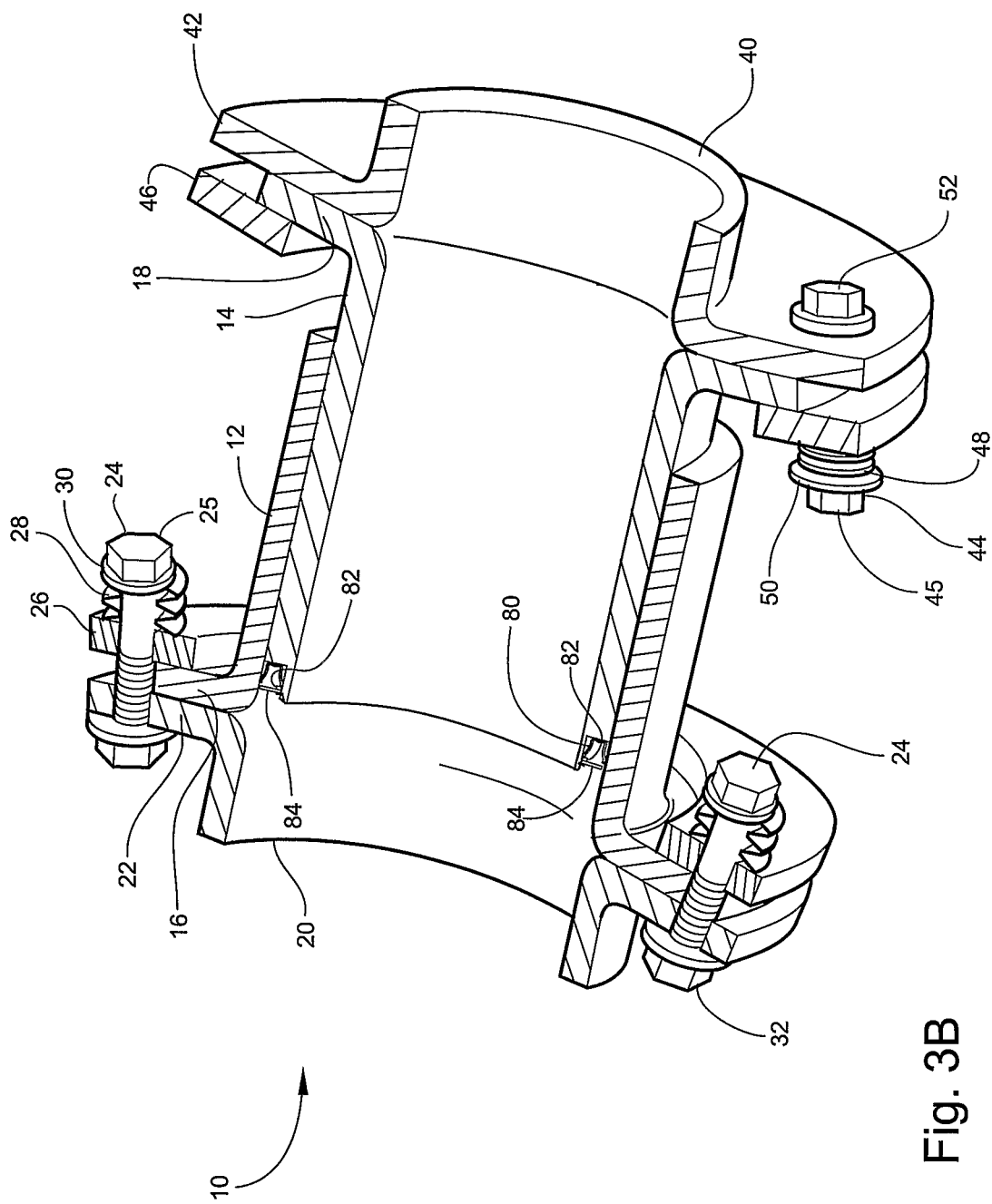
FIG. 3B is a cross-sectional view, in perspective, of the volumetric sealing system of FIG. 1.
Figure 6B:
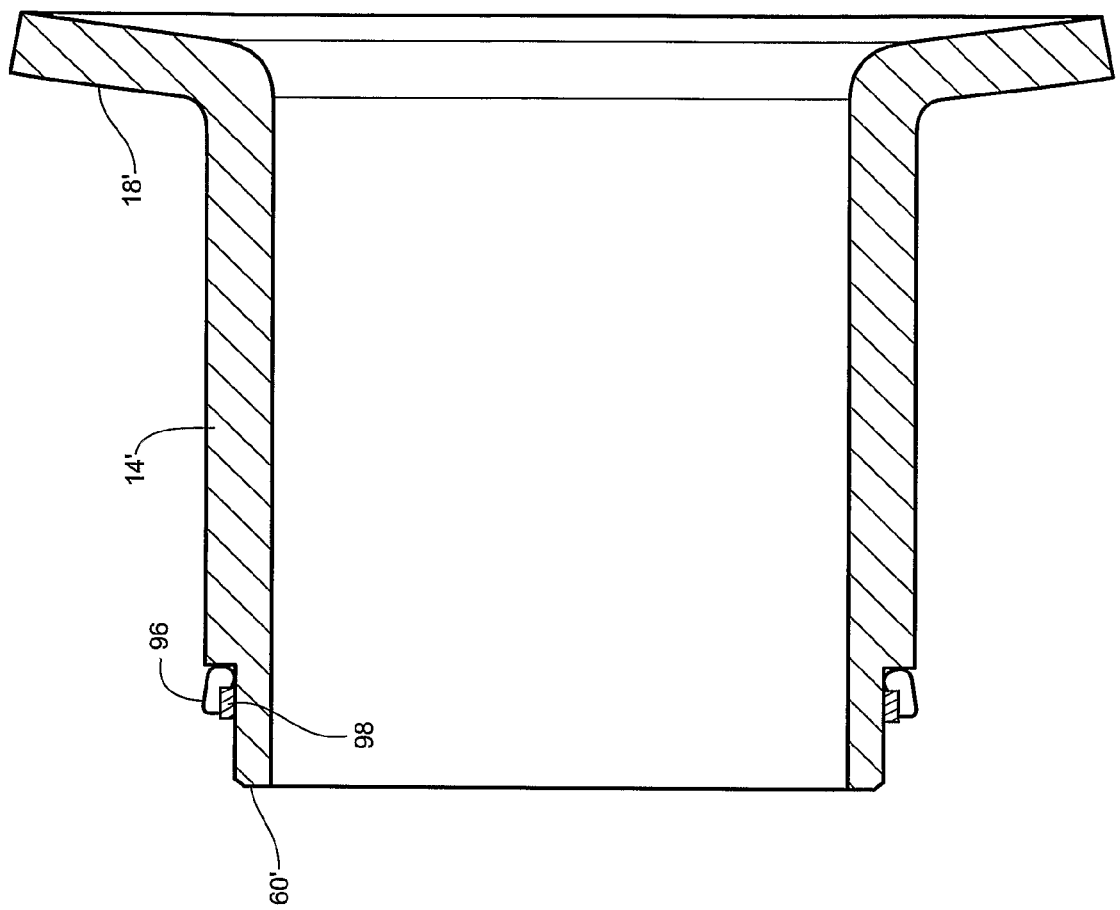
FIG. 6B is an alternate embodiment of the inner housing.

FIG. 6B shows alternate inner housing 14' which has flanged section 18' that is similar to flange section 18 shown in FIGS. 3B and 4. Annular seal 96 is configured as the aforesaid axial, "J" shaped seal. Retainer ring 98 retains annular seal 96 in place. An insulating spacer and heat shield, not shown but similar to insulating spacer 82 and heat shield 84, respectively, shown in FIG. 6A, are also used to protect annular seal 96. In a preferred embodiment, retainer ring 98 is rigidly connected to housing 14'.

Figure 7:
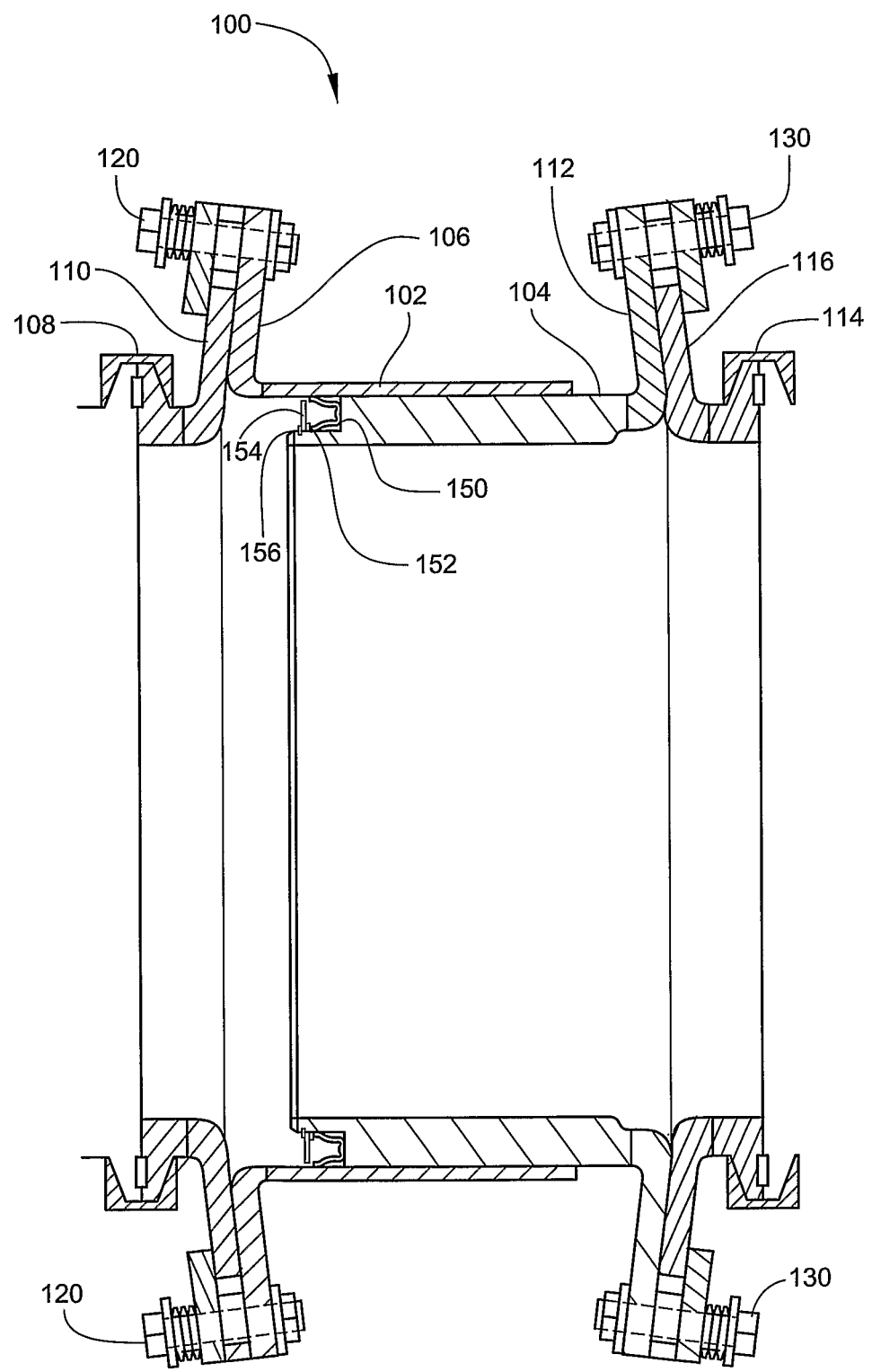
FIG. 7 is a cross-sectional view of a volumetric sealing system in accordance with another embodiment of the present invention.

Flanged sections 16 and 18 may have concave, convex or straight geometries. For example, as shown in FIG. 5, flanged sections 16 and 18 have concave geometries. Referring to FIG. 7, there is shown volumetric sealing system 100 that utilizes flanged sections having a convex geometry. Sealing system 100 comprises outer housing 102, and inner housing 104. Inner housing 104 can move axially or radially with respect to outer housing 102 and vice verse. Outer housing 102 has a flanged section 106 which has a convex geometry. Sealing system 100 can use any one of a variety of clamping devices. One such clamping device is clamp 108. Clamp 108 has a flanged section 110. Flanged section 110 has a concave geometry that corresponds to the convex geometry of flange 106. This configuration allows flanged section 110 to be connected to flanged section 106. Similarly, inner housing 104 has a flanged section 112 which has a convex geometry. Sealing system 100 further comprises a typical clamp 114 which has a flanged section 116. Flanged section 116 has a concave geometry that corresponds to the convex geometry of flanged section 112. This concave geometry allows bolts 120 to be positioned in an orientation that is opposite to the orientation of bolts 24 of sealing system 10 (see FIG. 5), and allows bolts 130 to be positioned in an orientation that is opposite to the orientation of bolts 44 of sealing system 10 (see FIG. 5). Clamp 114 is just one of a variety of suitable clamping devices that can be used with sealing system 100.

Referring again to FIG. 7, sealing system 100 includes annular seal 150, circumferentially extending heat insulating spacer 152, circumferentially extending heat shield 154 and retainer ring 156 which have the same function and structure as annular seal 80, heat insulating spacer 82, heat shield 84 and retainer ring 86, respectively, shown in FIG. 5.

The capability of configuring the sealing system of the present invention to have flange sections 16 and 18 with concave geometries (see FIG. 5), or flange sections 106 and 112 with convex geometries (see FIG. 7) provides an important advantage when attempting to retrofit or repair an existing sealing system 10 or 100 that is already integrated into a main manifold, piping or conduit system. In a further embodiment, the sealing system of the present invention is configured to utilize a combination of convex and concave geometries. For example, sealing system 10 can be configured so that flange section 16 has a concave geometry and flange section 18 has a convex geometry.

Referring to FIGS. 8, 9A, 9B and 10, there is shown volumetric sealing system 200 in accordance with a further embodiment of the present invention. Sealing system 200 has outer transfer tube 202 which has inner surface 203. Sealing system 200 also has inner transfer tube 204. Inner transfer tube 204 is telescopically disposed within outer transfer tube 202 and thus can slide with respect to outer transfer tube 202. Inner transfer tube 204 has outer surface 205. Outer transfer tube 202 and inner transfer tube 204 are generally cylindrical in shape and are configured to function as conduits for flowing matter. However, transfer tubes 202 and 204 can also operate with equalized pressure therein or a vacuum therein. Outer transfer tube 202 has alignment flange 206. Similarly, inner transfer tube 204 has alignment flanged 208. In a preferred embodiment, outer transfer tube 202 and inner transfer tube 204 are fabricated from a metal. Suitable metals include stainless steel, titanium, copper, brass, nickel, steel, iron, etc. In a preferred embodiment, outer transfer tube 202 and inner tube 204 are fabricated from corrosion-resistant metals. In a preferred embodiment, sealing system 200 further includes pressure rings 210 and 212, and clamping devices 214 and 216. Pressure ring 210 and clamping device 214 cooperate to firmly and precisely attach alignment flange 206 to connecting seal ring 220. In one embodiment, each clamping device 214 comprises a bolt, nut and spring washer. Alignment flange 206 and connecting sealing ring 220 have openings for receiving each bolt of each clamping device 214. Similarly, pressure ring 212 and clamping devices 216 cooperate to firmly and precisely attach alignment flange 208 to connecting seal ring 222. In one embodiment, each clamping device 216 comprises a bolt, nut and spring washer. Alignment flange 208 and connecting sealing ring 222 have openings for receiving each bolt of each clamping device 216.

Figure 8:
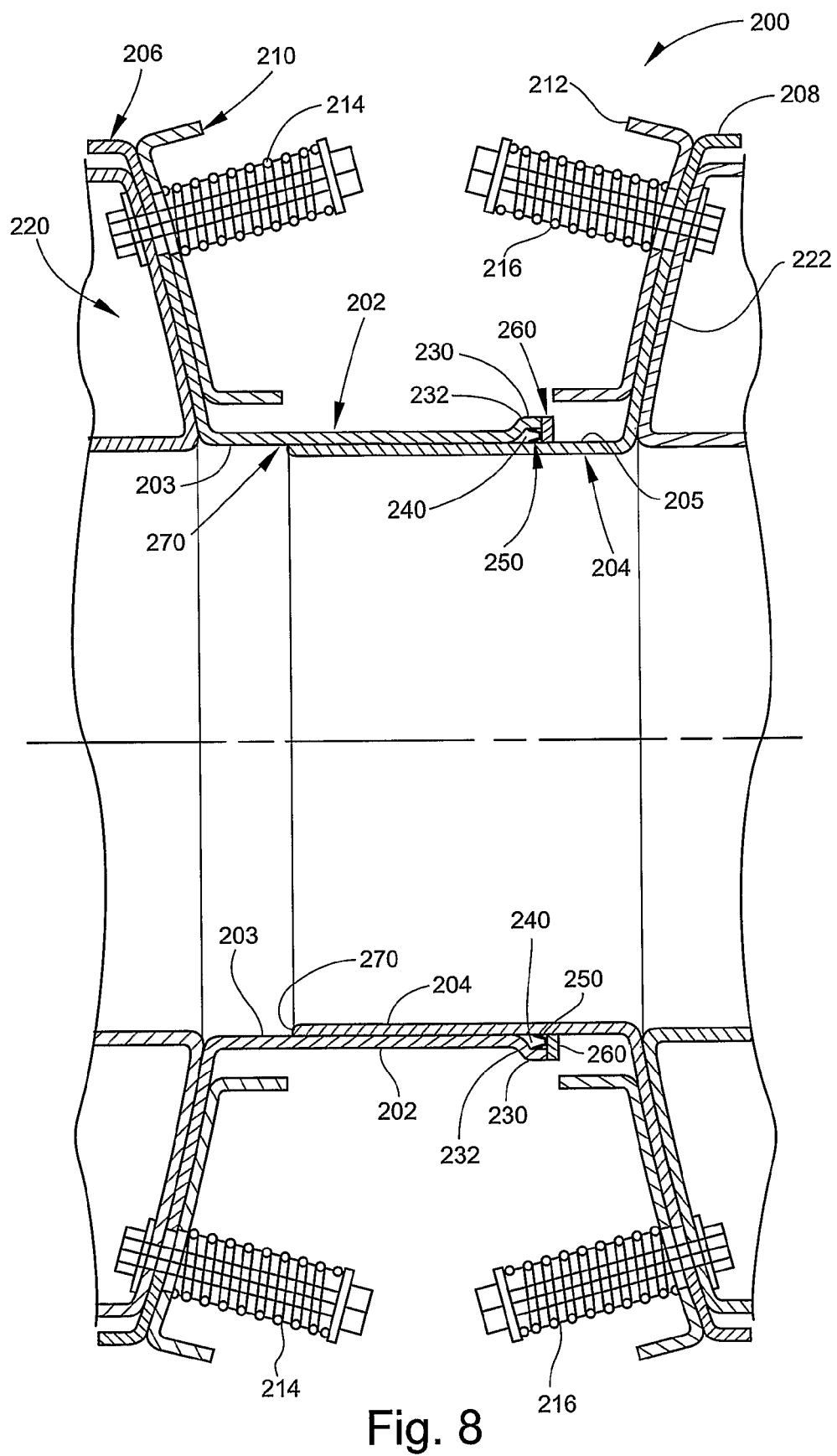
FIG. 8 is a side elevational view, in cross section, of a volumetric sealing system in accordance with a further embodiment of the present invention.
Figure 9A:
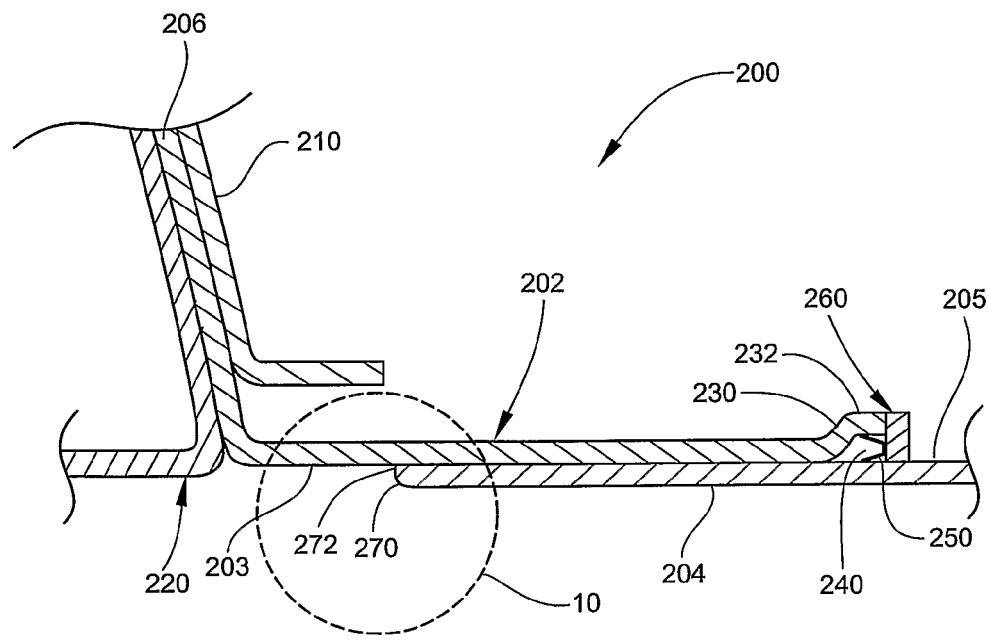
FIG. 9A is an enlarged view of a portion of the view shown in FIG. 8.
Figure 10:
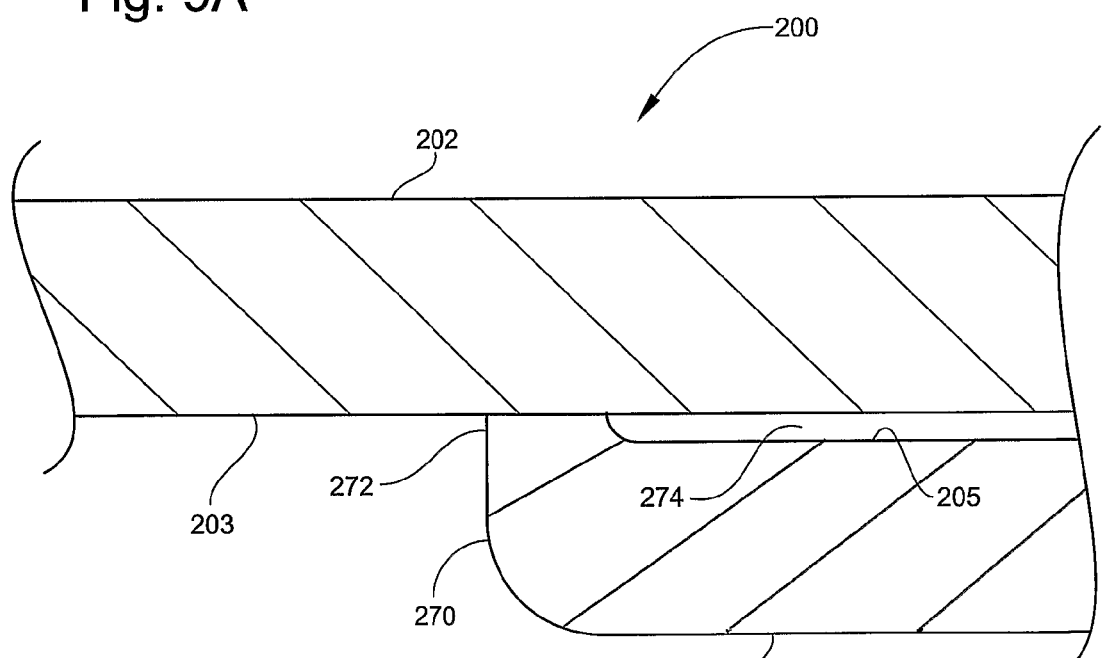
FIG. 10 is an enlarged view of a portion of the view of FIG. 9A.
Figure 9B:
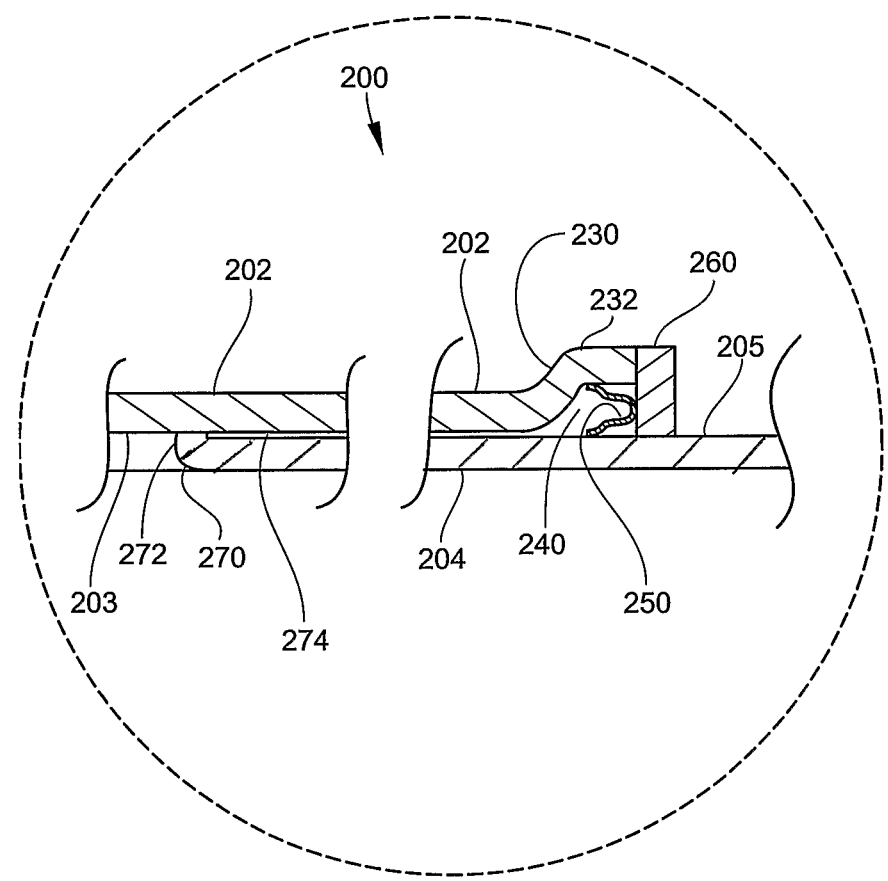
FIG. 9B is an enlarged view of a portion of the view shown in FIG. 9A.

Referring to FIGS. 8, 9A and 9B outer transfer tube 202 has end portion 230 that comprises stepped portion 232. Stepped portion 232 and outer surface 205 of inner transfer tube 204 cooperate to define a circumferentially extending channel or space 240 that is sized to receive annular, axial seal 250. Annular, axial seal 250 can be configured as any of the annular, axial seals described in the foregoing description. Retainer ring 260 is connected to stepped portion 232 and encloses channel or space 240 so as to retain annular, axial seal 250 within channel 240. Retainer ring 260 is preferably fabricated from the same materials used to fabricate retainer ring 86 described in the foregoing description.

Referring to FIGS. 8, 9A, 9B and 10, inner transfer tube 204 extends to end portion 270. End portion 270 has a radially extending lip 272 that contacts inner surface 203 of outer transfer tube 202. As a result of the configuration of lip 272, there is a space 274 between outer surface 205 of inner transfer tube 204 and outer transfer tube 202. As transfer tubes 202 and 204 move relative to each other, lip 272 scrapes inner surface 203. Thus, lip 272 functions as a mechanical scraper lip and has four functions: (a) it wipes away exhaust gas or other residue, (b) it serves as the front alignment bearing, (c) it keeps space 274 clean, and (d) it functions as a heat barrier to protect axial seal 250. Since axial seal 250 is positioned external to inner transfer tube 204, there is no possibility of components or parts falling into the matter flowing through transfer tubes 202 and 204.

Figure 11A:
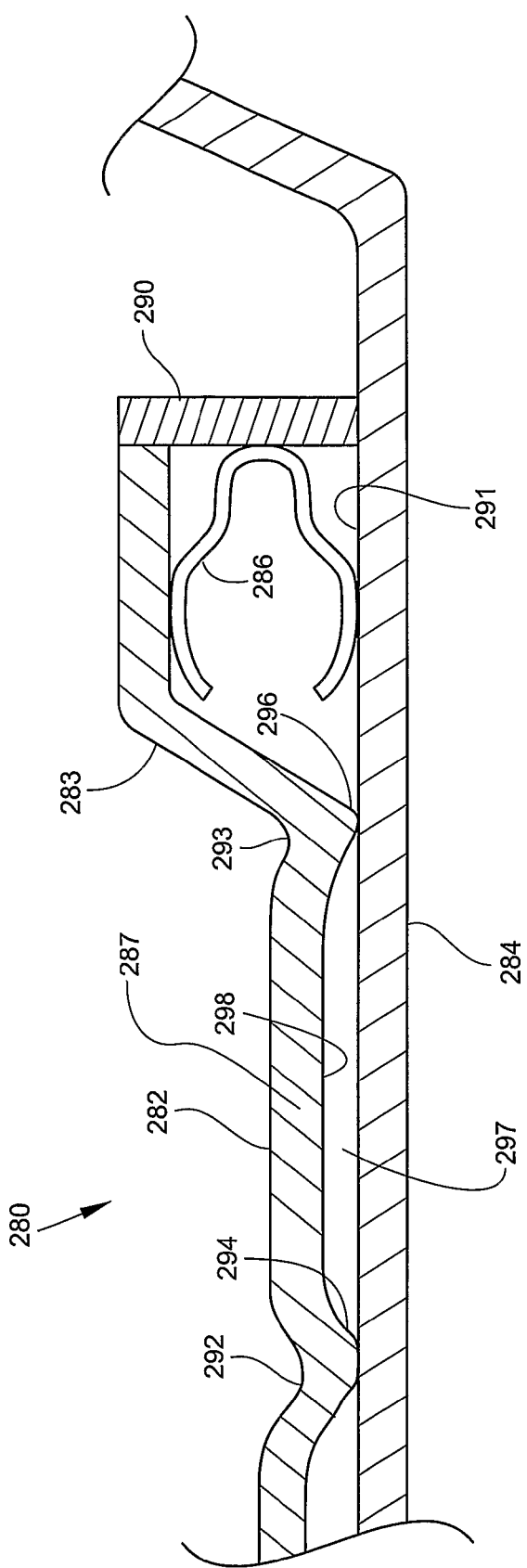
FIG. 11A is a partial, side elevational view, in cross-section, of a volumetric sealing system in accordance with another embodiment of the present invention, this embodiment of the volumetric sealing system being a fabricated version of the present invention.
Figure 11B:
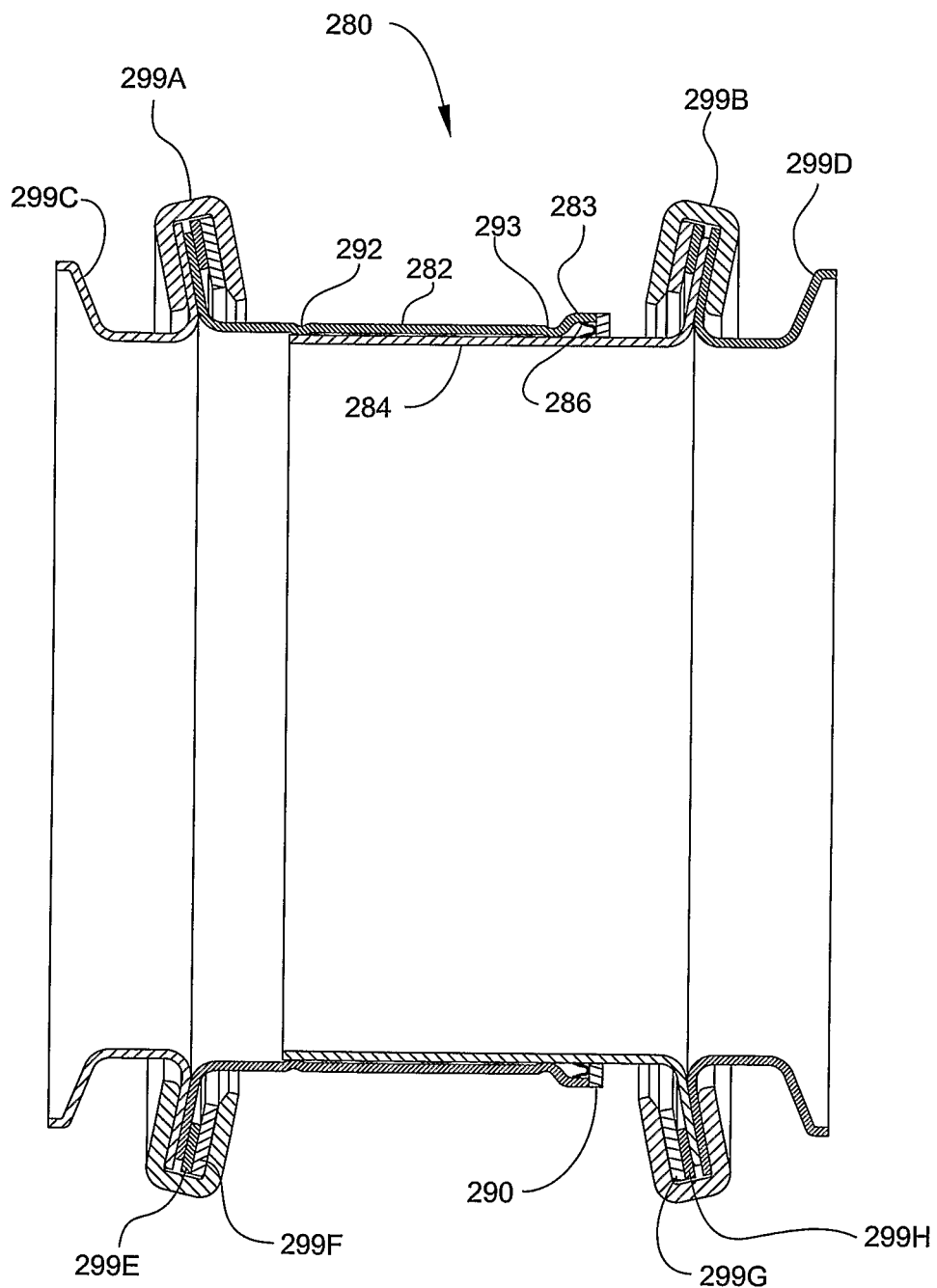
FIG. 11B is a side view, in cross-section, of the volumetric sealing system of FIG. 11A.

Referring to FIGS. 1A and 11B, there is shown volumetric sealing system 280 in accordance with an alternate embodiment of the present invention. FIG. 11B is a fall view of sealing system 280 and FIG. 11A is an enlarged view of a portion of the view shown in FIG. 11B. Sealing system 280 is a fabricated version of the present invention. Sealing system 280 has outer transfer tube 282 which has stepped portion 283. Sealing system 280 also includes inner transfer tube 284 that is telescopically disposed in outer transfer tube 282. Sealing system 280 also includes annular axial seal 286 and retainer ring 290. Inner transfer tube 284 has outer surface 291 which cooperates with stepped portion 283 to provide a circumferentially extending channel that is sized to receive annular, axial seal 286. Retainer ring 290 is connected to stepped portion 283 and encloses the aforesaid circumferentially extending channel and retains annular, axial seal 286. Annular, axial seal 286 is an outside seal thereby preventing any debris or foreign particles from penetrating the interior of transfer tubes 282 and 284. Outer transfer tube 282 generally has the same function as outer transfer tube 202 described in the foregoing description plus additional functions. Specifically, outer transfer tube 282 has a plurality of dips or indented portions 292 and 293 which function as concentricity bearings. Indented portions 292 and 293 provide protruding regions or bumps 294 and 296, respectively, on the inner side 298 of outer transfer tube 282. Protruding regions or bumps 294 and 296 wipe away exhaust gas or other residue on outer surface 291, serve as the front alignment bearings, keep space 297 clean, and function as a heat barrier for seal 286. Indented portions 292 and 293 are also minimal heat transfer points to keep annular, axial seal 286 cool. As shown in FIG. 11A, there is shown a fall view of sealing system 280. In a preferred embodiment, sealing system 280 includes annular clamping devices 299A and 299B. Annular clamping device 299A connects outer transfer tube 282 to manifold section 299C. Similarly, annular clamping device 299B connects inner transfer tube 284 to manifold section 299D. Annular clamping device 299A includes alignment spacer 299E and load ring 299F. Similarly, annular clamping device 299B includes load ring 299G and alignment spacer 299H.

Figure 12:
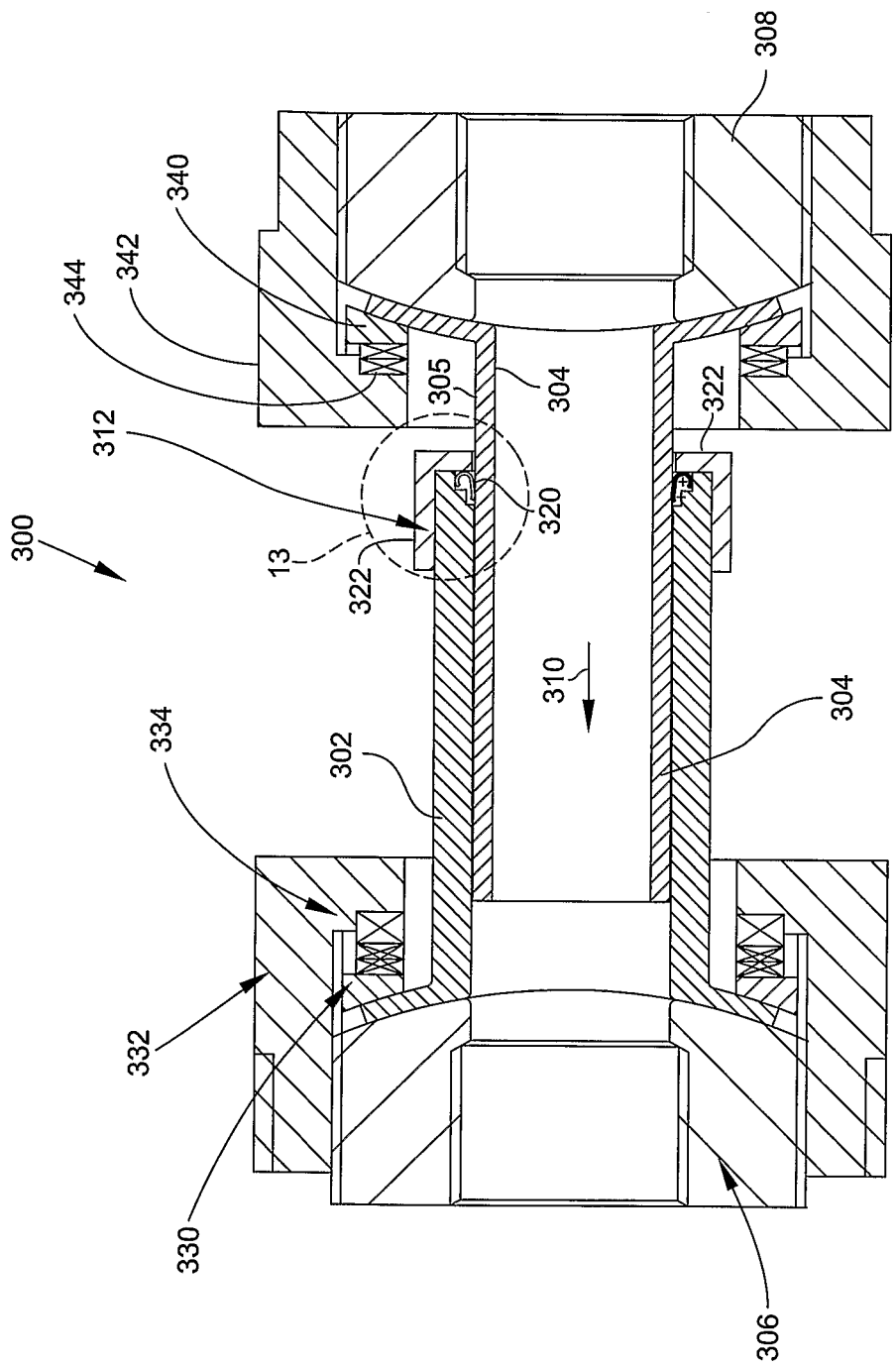
FIG. 12 is a side elevational view, in cross-section, of a volumetric sealing system in accordance with another embodiment of the present invention, this embodiment of the volumetric sealing system being configured for high pressure.
Figure 13:
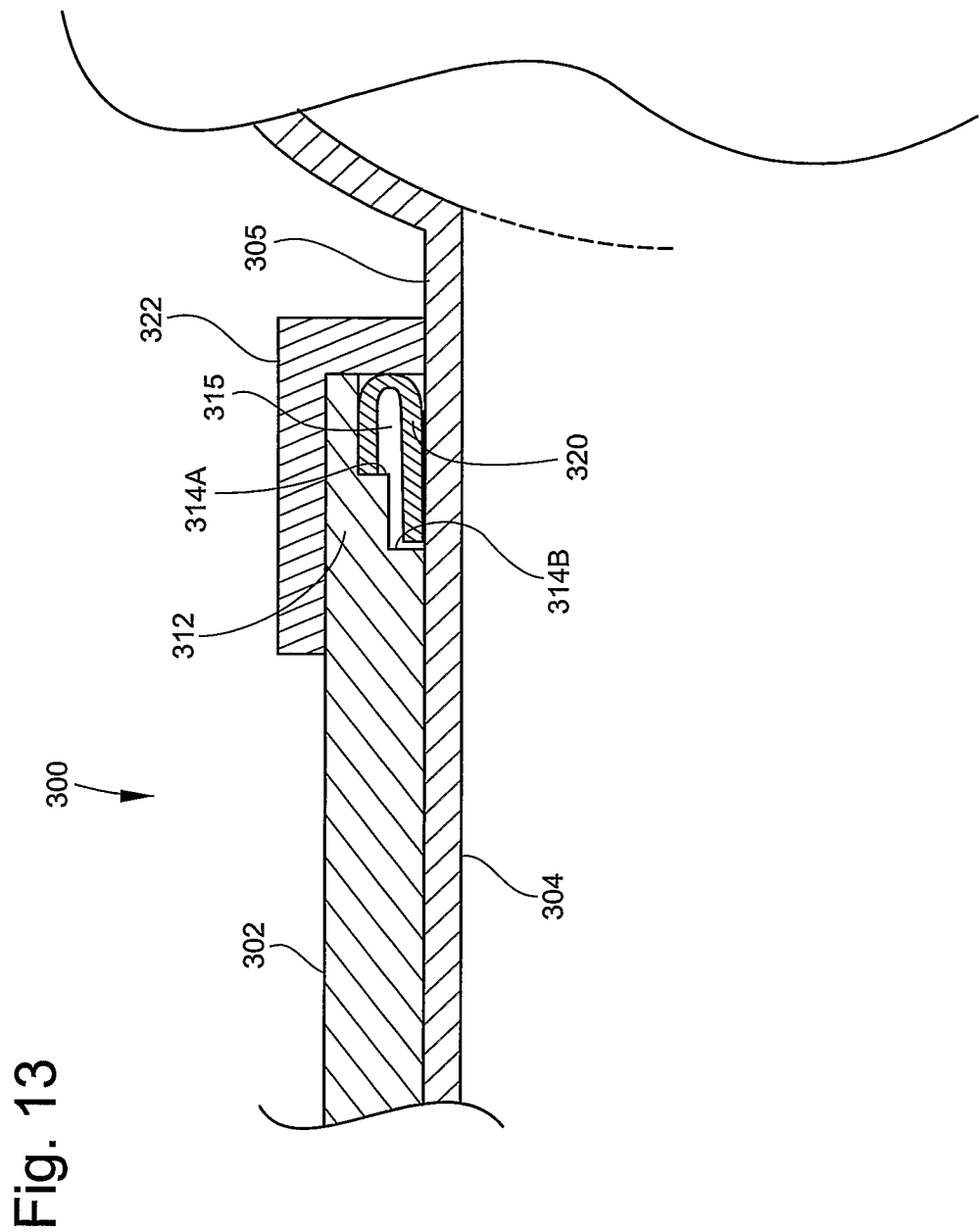
FIG. 13 is an enlarged view of a portion of the view shown in FIG. 12.

Referring to FIGS. 12 and 13, there is shown volumetric sealing system 300 in accordance with another embodiment of the present invention. Volumetric sealing system 300 is configured for high pressure, but can also be used with medium or low pressure flows. Furthermore, regardless of the degree of pressure of the flowing matter, sealing system 300 can be used in highly toxic environments. Sealing system 300 comprises outer transfer tube 302 and inner transfer tube 304. Inner transfer tube 304 is telescopically disposed within the interior region of outer transfer tube 302. Outer transfer tube 302 and inner transfer tube 304 can move axially or radially to one another. Inner transfer tube 304 has outer surface 305. Sealing system 300 includes connecting seal rings 306 and 308. Flowing matter flows through connecting sealing ring 308, inner transfer tube 304 and connecting sealing ring 306 in the direction indicated by arrow 310. Outer transfer tube 302 has end portion 312 (see FIG. 13) that has a notch or cut-out that provides shoulders 314A and 314B. This notched geometry of end portion 312 cooperates with exterior or outer surface 305 of inner transfer tube 304 to define circumferentially extending channel 315. Channel 315 is sized to receive annular, axial seal 320. Annular axial seal 320 can be configured as any of the axial seals described in the foregoing description. In this particular embodiment, annular axial seal 320 is configured as the "J" shaped axial seal described in the foregoing description. Retainer ring 322 is attached to outer transfer tube 302 and encloses channel 315 so as to retain annular, axial seal 320 in place. Annular, axial seal 320 is an outside seal thereby preventing any debris or foreign particles from penetrating the interior of transfer tubes 302 and 304. As shown in FIG. 12, sealing system 300 includes pressure ring 330, pressure ring support 332 and disc-belleville spring 334 that is interposed between pressure ring 330 and pressure ring support 332. Similarly, sealing system 300 includes pressure ring 340, pressure ring support 342 and disc-belleville spring 344 that is interposed between pressure ring 340 and pressure ring support 344.

The volumetric sealing system of the present invention has many advantages and benefits. An important advantage of the volumetric sealing system of the present invention is that annular seals 80, 150, 250, 286 and 320 allow for significantly larger misalignments of dynamic and/or static displacements than what is currently possible with prior art sealing systems. Another important feature of this volumetric sealing system is that the inner and outer housings or transfer tubes can move axially or radially with respect to each other. This feature allows for expansion and movement resulting from temperature changes, mechanical vibrations and shocks or sudden impacts. The ability of the inner and outer housings and transfer tubes to axially and radially move with respect to one another allows the volumetric sealing system to be easily collapsed so that it can be removed or installed. Other advantages of the volumetric sealing system of the present invention are that it can be used in environments having sub-zero temperatures or temperatures as high as 1500° F. This temperature range can be extended by fabricating the volumetric sealing system from specially selected materials. Other advantages of the volumetric sealing system of the present invention are that is can be used in low or high humidity environments, at high altitudes or below sea level, with caustic fluids as well as alkaline fluids, in low viscosity or high viscosity conditions, and with low pressure fluids or high pressure fluids.

In an alternate embodiment, the volumetric sealing system of the present invention is used with a power transfer device. For example, in such a configuration, outer housing 12 is connected to a stationary enclosure (not shown) and inner housing 14 is also connected to a stationary enclosure (not shown). Fluid is within outer and inner housings 12 and 14, respectively. A power transfer device (not shown) extends through outer and inner housings 12 and 14, respectively, and rotates so as to drive some other piece of machinery down line. Although the power transfer device rotates, outer and inner housings 12 and 14, respectively, do not rotate.

The principles, preferred embodiments and modes of operation of the present invention have been described in the foregoing specification. This invention should not be construed as limited to the particular forms disclosed, as these are to be regarded as illustrative rather than restrictive. Variations and changes may be made by those skilled in the art without departing from the spirit of the invention. Accordingly, the foregoing detailed description should be considered as exemplary in nature and not as limiting the scope and spirit of the invention as set forth in the attached claims.

The invention claimed is:

1. A sealing system that can be fluidly connected between couplings to allow matter to flow from one coupling through the sealing system and into the other coupling, the sealing system comprising:
   a first coupling having a first flanged section;
   a generally cylindrical outer housing section having an interior region, a pair of outlets in communication with the interior region, and an interior surface surrounding the interior region the outer housing section including a second flamed section that has a first surface that abuts the first flanged section of the first coupling and an opposite second surface;
   a first load ring extending about the generally cylindrical outer housing section and abutting the opposite second surface of the second flanged section;
   a first plurality of spring-loaded fastening systems that fasten to ether the first flanged section, the second flanged section and the first load ring;
   a second coupling having a third flanged section;
   a generally cylindrical inner housing section comprising a first portion disposed within the interior region of the outer housing section and a second portion external to the interior region of the outer housing section, the inner housing section having an exterior surface that contacts the interior surface of the outer housing section, the inner housing section having an interior region for the flow of matter therethrough, the first portion of the inner housing section having an outlet in communication with the interior region of the inner housing section to allow matter to flow through the interior region of the inner housing section and into the interior region of the outer housing section, wherein the inner housing section is telescopically disposed within the outer housing section such that the inner housing section and outer housing section can (i) move axially with respect to each other so as to allow the overall length of the sealing system to be increased or decreased, and (ii) rotate with respect to each other if an angular force is applied to either the inner housing section or outer housing section, the inner housing section defining a circumferentially extending shoulder that is proximate to the outlet of the inner housing section and which has a wall, wherein the shoulder includes a circumferentially extending groove, the inner housing section including a fourth flanged section that has a first surface that abuts the third flanged section of the second coupling and an opposite second surface;

a second load ring extending about the generally cylindrical inner housing section and abutting the opposite second surface of the fourth flanged section;

a second plurality of spring-loaded fastening systems that fasten to ether the third flanged section, the fourth flanged section and the second load ring;

an annular, metallic seal positioned on the shoulder and abutting the wall, the annular, metallic seal being sized so as to contact the interior surface of the outer housing section so as to create a seal between the interior surface of the outer housing section and the exterior surface of the inner housing section;

a circumferentially extending heat insulating spacer attached to the shoulder, the heat insulating spacer abutting the annular, metallic seal in order to retain the annular, metallic seal in place, wherein the heat insulating spacer substantially reduces the amount of heat transferred to the annular metallic;

a circumferentially extending heat shield connected to the shoulder for shielding the annular, metallic seal from heat, the circumferentially extending heat shield having a first flat side and an opposite second flat side that abuts the heat insulating spacer, the heat shield being located such that the heat insulating spacer is positioned between the opposite second flat side of the heat shield and the annular, metallic seal, wherein the heat shield and heat insulating spacer cooperate to significantly reduce the amount of heat to which the annular, metallic seal is exposed so as to preserve the integrity and operational lifespan of the annular, metallic seal; and a circumferentially extending retainer ring connected to the shoulder and rigidly positioned within the groove in the shoulder, the circumferentially extending retainer ring having a first flat side and an opposite second flat side that abuts the first flat side of the heat shield, the retainer ring being fabricated from a material that can withstand relatively high temperatures, the heat shield being located between the retaining ring and the heat insulating spacer and wherein the retaining ring retains the heat shield, heat insulating spacer and annular, metallic seal in place so that when outer housing section and inner housing section move axially or rotate with respect to each other, the sealing function of the annular, metallic seal is maintained.

2. The sealing system according to claim 1 wherein the first flanged section of the first coupling has a first plurality of through-holes and the second flanged section of the outer housing section has a second plurality of through-holes, wherein each one of the second plurality of through-holes is substantially aligned with a corresponding through-hole of the first plurality of through-holes, wherein the first load ring has a third plurality of through-holes wherein each through-hole of the third plurality of through-holes is substantially aligned with corresponding through-holes of the first and second plurality of through-holes so as to define a set of aligned through-holes and wherein each spring-loaded fastening system of the first plurality of spring-loaded fastening systems comprises:

a tension bolt disposed within a corresponding set of aligned through-holes and having a head and a threaded portion;

a nut threaded to the threaded portion such that the nut abuts the first flanged section of the first coupling; and a load device on the tension bolt and interposed between the head of the tension bolt and the first load ring.

3. The sealing system according to claim 2 wherein the load device comprises a spring.

4. The sealing system according to claim 2 wherein the load device comprises a Belleville washer.

5. The sealing system according to claim 2 further comprising an alignment spacer interposed between the load device and head of the tension bolt.

6. The sealing system according to claim 1 wherein the third flanged section has a fourth plurality of through-holes and the fourth flanged section has a fifth plurality of through-holes, wherein each through-hole of the fifth plurality of through-holes is substantially aligned with a corresponding through-hole of the fourth plurality of through-holes, wherein the second load ring has a sixth plurality of through-holes, wherein each through-hole of the sixth plurality of through-holes is substantially aligned with corresponding through-holes of the fourth and fifth plurality of through-holes so as to define a set of aligned through-holes, and wherein each spring-loaded fastening system of the second plurality of spring-loaded fastening systems comprises:

a tension bolt disposed within a corresponding set of aligned through-holes and having a head and a threaded portion;

a nut threaded to the threaded portion such that the nut abuts the third flanged section of the second coupling; and a load device on the tension bolt and interposed between the head of the tension bolt and the second load ring.

7. The sealing system according to claim 6 wherein the load device comprises a spring.

8. The sealing system according to claim 6 wherein the load device comprises a Belleville washer.

9. The sealing system according to claim 6 further comprising an alignment spacer interposed between the load device and the head of the tension bolt.

10. The sealing system according to claim 1 wherein the annular, metallic seal has a generally U-shaped cross-section, a closed end that abuts the wall of the shoulder and a pair of spaced-apart seal wall sections that are attached to and extend from the closed end, wherein a first one of the pair of spaced-apart seal wall sections contacts the interior surface of the outer housing section and a second one of the pair of spaced-apart seal wall sections contacts the shoulder.

11. The sealing system according to claim 1 wherein the annular, metallic seal has a generally "J" shaped cross-section.

12. The sealing system according to claim 1 wherein the annular, metallic seal has a generally "V" shaped cross-section.

\* \* \* \* \*